United States Patent [19]

Watanabe

[11] Patent Number: 5,234,081

[45] Date of Patent: Aug. 10, 1993

[54] ROTARY INDEXING DEVICE

[75] Inventor: Hayao Watanabe, Takasaki, Japan

[73] Assignee: NSK Ltd., Tokyo, Japan

[21] Appl. No.: 727,920

[22] Filed: Jul. 10, 1991

[30] Foreign Application Priority Data

Jul. 10, 1990 [JP] Japan .............................. 2-73292[U]

[51] Int. Cl.$^5$ .................................................. F16D 25/04
[52] U.S. Cl. .................................... 188/74; 188/366;
310/77
[58] Field of Search ................. 188/74, 75, 76, 151 R,
188/365, 366, 67; 310/77, 93, 123, 67 R, 92

[56] References Cited

U.S. PATENT DOCUMENTS

| | | | |
|---|---|---|---|
| 2,520,204 | 8/1950 | Hancock | 310/77 |
| 2,542,545 | 2/1951 | Lyman | 188/366 |
| 2,731,312 | 1/1956 | Du Bois | 188/366 |
| 3,289,137 | 11/1966 | Jones et al. | 188/74 |
| 4,497,398 | 2/1985 | Patel | 188/366 |
| 4,877,987 | 10/1989 | Flaig et al. | 310/93 |
| 5,072,651 | 12/1991 | Kagita | 188/151 R |

Primary Examiner—Matthew C. Graham

Attorney, Agent, or Firm—Oblon, Spivak, McClelland, Maier & Neustadt

[57] ABSTRACT

This invention provides a rotary indexing device which applies a uniform pressing force radially on a rotational shaft without applying any force axially thereon. The rotary indexing device comprises a rotational shaft which is rotatably journaled on a housing and is fixed on the rotor of a motor within the housing, a clamping sleeve arranged inside the housing to oppose the perimetric portion of the rotational shaft on one perimetric face thereof across a small interstice, an elastic member which covers the other perimetric portion of the clamping sleeve and forms with the housing a sealed pressurizing chamber, and a fluid path which introduces pressurizing fluid from outside of the housing into the pressurized chamber, which is characterized in that the clamping sleeve is formed with plural slits on the perimeter thereof so as to be deformable radially while the clamping sleeve perimetric portion is clamped with pressure from the pressurizing chamber to be radially pressed snugly on the perimetric portion of the rotational shaft.

4 Claims, 5 Drawing Sheets

ROTARY INDEXING DEVICE

BACKGROUND OF THE INVENTION

1. Field of the Invention

This invention relates to a clamp device for a rotational output shaft, and more particularly to a rotary indexing device for a rotational output shaft for rotary indexing the output shaft which is driven to rotate without applying unnecessary loads in the axial direction to thereby prevent axial displacement thereof, but applying a uniform pressure in the radial direction. This invention is applicable to the clamp mechanism for a cutter table or an indexing device of an NC lathe connected to an output shaft of a motor.

2. Discussion of the Background

As a clamp device for rotational shaft of this type, there has been known in the prior art a rotation indexing device of direct drive type which is incorporated within a clamp device as is disclosed in Japanese Utility Model Application Laid Open No. 121636/1989. In the device, a motor stator is fixed inside of a housing and a motor rotor is provided coaxially with the motor stator. The motor rotor is integrally fixed with an output shaft which extends in the axial direction and is journaled via bearings onto the housing in a freely axially rotatable manner. The motor stator, the motor rotor, the output shaft and the bearings form a rotational shaft which directly drives and rotates an indexing table. The rotational shaft is suspended at a predetermined position while the rotational angle thereof is being detected by a rotation detector and is held by a clamp mechanism at the position.

The clamp mechanism includes a cylinder which has a flange extending in the radial direction and is attached to the housing in an axially freely slidable manner, a piston which is provided to oppose the cylinder and is axially slidable so as to freely attach to/detach from the rear face of an indexing table, and a pressurizing chamber interposed between opposing planes of the cylinder and of the piston.

For clamping, when a pressurizing fluid such as the compressed air and oil is fed to the pressurizing chamber, the cylinder and the piston are slided to oppose each other in the direction to thrust the rotational shaft so as to intensely press the output shaft on the upper surface thereof by the cylinder for putting brakes on its rotation as well as to intensely press the rear surface of the indexing table by the piston to apply a force opposing the force applied on said output shaft in the thrusting direction. The thrusting force applied on the indexing table is thereby offset to prevent the indexing table from being displaced axially.

However, the prior art clamp device for rotational shaft is not quite satisfactory. Because axial rotations are restricted by applying load on the output shaft in the thrusting direction for clamping, it is necessary to apply counterforce on the indexing table in the opposite direction to prevent axial displacement of the table. Moreover, the braking force and the counterforce should be balanced. This disadvantageously makes the structure complicated, the size bulky and the weight heavy. As the restricting or breaking force to be applied on the output shaft is directed in the thrusting direction, the area for receiving the restricting force becomes extremely limited, which in turn increases the pressure in a unit area.

SUMMARY OF THE INVENTION

This invention was contrived in view of the above mentioned problems encountered in the prior art and aims at providing a rotary indexing device which is simple in structure, light in weight and compact in size by applying a restricting or braking force on the rotational shafts in the radial direction to thereby solve the problems.

Accordingly, in order to achieve the aforementioned objects, the rotary indexing device according to this invention includes a motor stator fixed inside a housing, a motor rotor provided coaxially with the motor stator, an output shaft which is integrally fixed on the motor rotor to extend axially and is journaled on said housing via bearings in a freely rotational manner, a clamping sleeve which is provided within said housing in a manner to oppose the output shaft on one perimetric surface via a narrow interstice and is formed with a number of slits on the perimetric surface thereof, an elastic member which covers the other perimetric surface of said clamping sleeve to form a sealed pressurizing chamber with said housing, and a fluid path in said housing which feeds the pressurizing fluid into said chamber wherein said clamping sleeve is radially deformed with the pressure from said pressurizing chamber to be pressed closely on the periphery of said output shaft.

According to this invention, for clamping a rotational shaft, the pressurizing fluid such as compressed air or oil is fed into the pressurizing chamber via the path. The pressure is applied on the perimetric face of the sleeve via the elastic member. The sleeve with a number of slits on the perimetry thereof is easily deformed in the radial direction to be pressed snugly on the periphery of the opposing output shaft and apply the even braking force in the radial direction. As no thrusting force is applied on said output shaft, axial displacement of the shaft does not occur. No thrusting force is imposed on bearings of the rotational shaft.

Therefore, there is no need to provide a means to apply a load or counterforce against the braking force, thus making the structure simple, the weight light and the size compact. As a larger area may be allocated for braking, the pressure per unit area can be made smaller.

BRIEF DESCRIPTION OF THE DRAWINGS

The foregoing and other objects, features and advantages of the invention will be apparent from the following more particular description of the preferred embodiments of the invention illustrated in the accompanying drawings, wherein.

DESCRIPTION OF THE PREFERRED EMBODIMENTS

Figure 1:
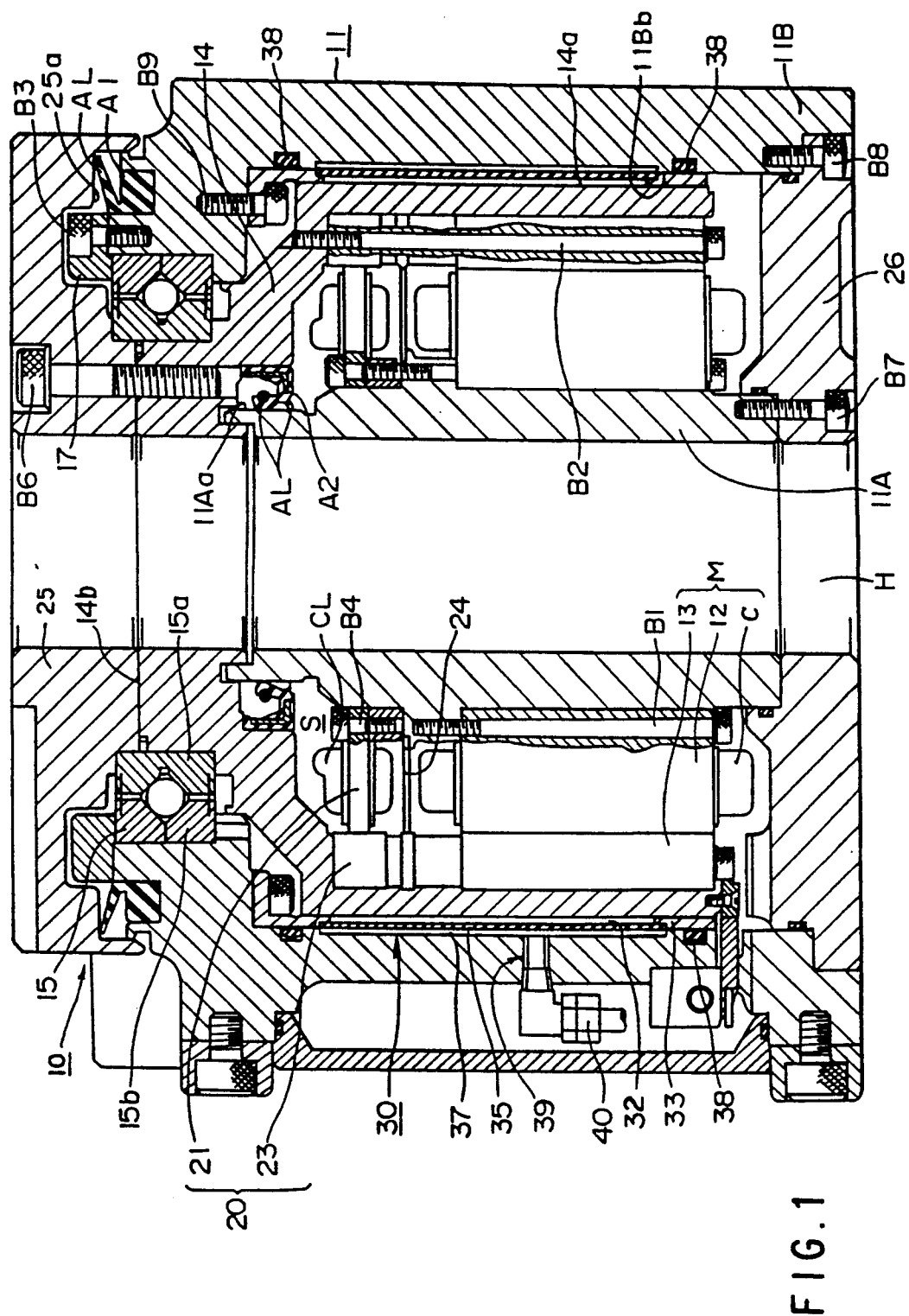
FIG. 1 is a cross sectional view of the clamp device according to this invention when applied for a rotation indexing device of direct drive type.

FIG. 1 shows a rotation indexing device 10 of a direct drive type with a motor and an indexing table. The cylindrical housing 11 houses a motor M wherein the electromagnetic gear teeth of a stator 12 are opposed to the teeth of the core of a rotor 13, the stator and the rotor being arranged coaxially. The motor stator 12 has plural magnetic poles each having the plural teeth, and the motor rotor 13 is driven by sequentially magnetizing the plural magnetic poles. The magnetic poles of the motor stator 12 are deviated in respect of phases of the teeth.

The housing 11 has an inner cylinder 11A with an axial hole H at the center thereof and an outer cylinder 11B erected on the outer circumference of the inner cylinder 11A at an interval in radial direction. The above mentioned motor M is housed in a space formed between the inner cylinder 11A and the outer cylinder 11B. More particularly, the motor stator 12 having a coil C is pressed in and fixed with a bolt B1 on the outer periphery of the inner cylinder 11A. The motor rotor 13 provided with teeth of the same pitch is rotatably attached on the outer periphery of the stator 12.

A cylindrical output shaft 14 is fit externally on the outer periphery of the motor rotor 13 to extend in the axial direction and is fixed with a bolt B2 in an integrally rotatable manner. An inner ring 15a of cross roller bearings 15 is fit on the outer periphery at the top end of the output shaft 14. An outer ring 15b of the cross roller bearings 15 is fit on the inner periphery of the outer cylinder 11B, and is fixed with an annular bearing holder 17 which in turn is fixed on the top end face of the outer cylinder 11b with a bolt B3.

In a space S defined by the rear surface of the output shaft 14 and the inner cylinder 11A above the motor M is housed a resolver 20 which is a rotation sensor of high resolution for positioning the motor M with high precision. A stator 21 of the resolver having a coil CL is attached on the upper inner peripheral face of the inner cylinder 11A with a bolt B4. A rotor 23 of the resolver is attached to the stepped portion on the rear surface of the output shaft 14 to oppose the stator 21. The stator 21 of the resolver has the teeth similar to those of the motor stator 12 and the coil CL is wound on each magnetic pole. The rotor 23 of the resolver has the teeth of the same pitch as those of the motor rotor 13.

When the motor rotor 13 is driven, the rotor 23 of the resolver 20 is also rotated, and the reluctance between the teeth of the stator 21 and the rotor changes. The change in reluctance is digitized by a resolver controller in a drive unit (not shown) and is used as the positional signal to detect the rotational angle of the rotor 23, and hence the rotational position of the output shaft 14. The stator 21 of the resolver 20 is magnetically insulated from the motor stator 12 with a magnetic shield plate 24.

An indexing table 25 is fixed with a bolt B6 on the top end face 14b of the output shaft 14. The indexing table 25 is exposed from the housing 11, and a lip AL of a seal member A1 attached on the top end face of the outer cylinder 11B is in slidable contact with the rear surface 25a of the indexing table 25 so as to prevent cutting fluid and the like from entering inside. A lip AL of the oil seal A2 attached on the rear surface of the output shaft 14 is slidably attached on the upper outer perimeter 11Aa of the inner cylinder 11A to seal the space S in which the resolver 20 and the motor M are housed.

A housing base 26 is attached with bolts B7 and B8 for sealing the inside of the housing 11 on the lower side of the inner cylinder 11A and the outer cylinder 11B at a position axially opposing the indexing table 25.

Figure 2A:
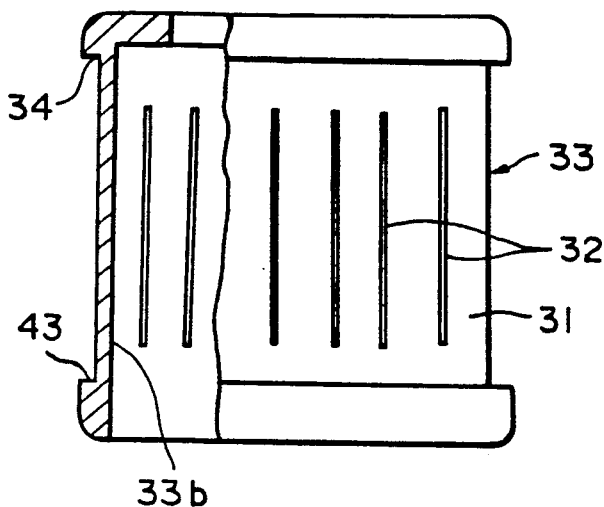
FIG. 2A is a partial side view of an embodiment of the clamping sleeve to be used in this invention.
Figure 3:
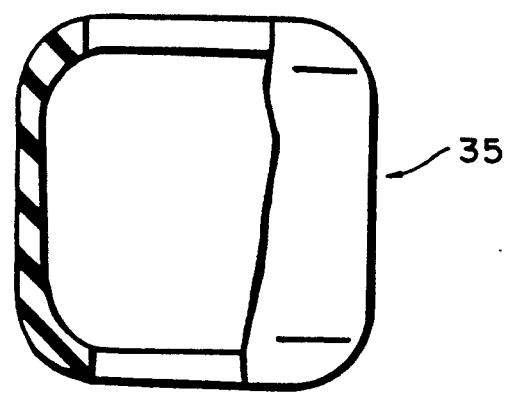
FIG. 3 is a partial section of an embodiment of the elastic member to be used in this invention.
Figure 4:
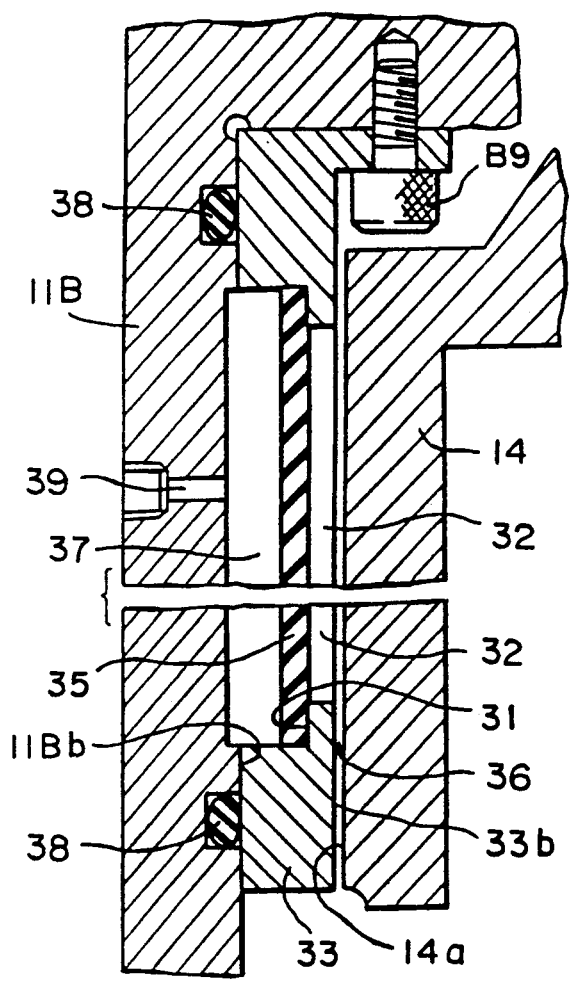
FIG. 4 is an enlarged cross section of a part of the pressurizing chamber of this invention.

In this embodiment, the clamp device 30 to restrict the rotation of the output shaft 14 is provided within a cylindrical space between the inner perimeter 11Bb of the outer cylinder 11B and the outer perimeter 14a of the output shaft 14. As shown in FIG. 2A, the clamp device 30 included a metal clamping sleeve 33 having a large number of parallel slits 32 cut axially on the perimeter 31 and an elastic member 35 made of either a rubber or plastic cylinder shown in FIG. 3 which is attached from above on the perimeter 31 of the clamping sleeve 33. The clamping sleeve 33 has steps 34, 43 near both ends of the outer periphery thereof. The elastic member 35 is placed over the sleeve 33 in a manner that both end edges of the elastic member 35 are held with the steps 34, 43. The clamping sleeve 33 with the elastic member 35 placed thereover is provided on the inner perimeter 11Bb of the outer cylinder 11B in a manner that the sleeve inner perimeter 33b is opposed to the outer perimeter 14a of the output shaft 14 via a narrow interstice 36 (not clearly shown in FIG. 1). FIGS. 1 and 4 are cross sectional views of the device cut axially along an arbitrary slit of the sleeve 33.

A pressurizing chamber 37 is provided between the inner perimeter 11Bb of the outer cylinder 11B and the elastic member 35 which is placed over the clamping sleeve 33. Both axial ends of the chamber 37 are sealed with an O-ring seal 38. The chamber 37 communicates to outside through a fluid path 39 provided on the outer cylinder 11B. Pressurizing fluid such as compressed air or hydraulic fluid is fed from a pressure source (not shown) to the chamber 37 via a fluid joint 40 connected to an opening of the path 39. The chamber 37 of the clamp device 30 is open to the atmospheric air when the output shaft 14 is not clamped. Therefore, the sleeve 33 is not applied with pressure and can form a narrow interstice 36 between the sleeve 33 and the outer perimetric face of the shaft 14 as mentioned above.

When electric current is passed through the coil C of the motor stator 12 via the driving unit (not shown) in such a state, the teeth of the stator 12 are magnetized in a predetermined order to rotate the motor rotor 13. As the rotor 23 of the resolver 20 is rotated with the motor rotor 13, reluctance against the teeth of the stator 21 of the resolver 20 changes. The change in reluctance is digitized by a controller of the resolver in the drive unit (not shown) and used as positioning signals to thereby restrict the rotational angle of the rotor 23 of the resolver 20, and hence the rotational angle of the motor output shaft 14. This enables indexing of the table 25.

On completion of indexing, an electromagnetic directional switching valve provided within the wiring system connected to the pressure source (not shown) is shifted to communicate with the pressure source in order to feed the compressed air (or hydraulic fluid) or a pressurizing fluid into the pressurizing chamber 37 of the clamp device 30. The pressure is concurrently applied on substantially all the outer perimetric face of the clamping sleeve 33. This deforms the sleeve 33 with slits 32 radially inward so as to closely attach the inner perimetric face 33b of the sleeve or the braking surface onto the outer perimeter 14a of the output shaft which is also a braking surface. As a result, the rotation of the shaft 14 is restricted to clamp the indexing table 25 at a predetermined position.

Then, the electromagnetic valve (not shown) is switched to communicate to the atmospheric pressure to depressurize the chamber 37. This causes the elastic member 35 and the sleeve 33 to return elastically to the original position and release the engagement between the inner perimeter 33b of the sleeve and the outer perimeter 14a of the output shaft, thus preparing for next indexing.

Figure 2B:
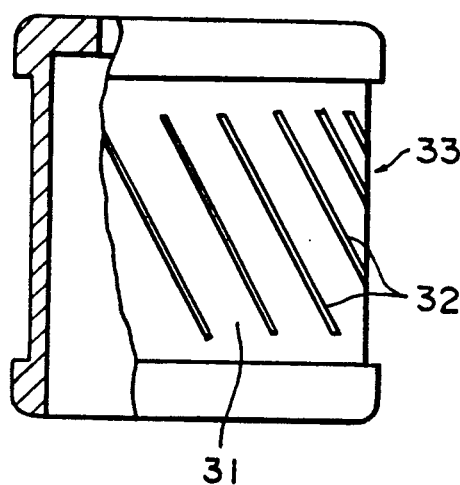
FIG. 2B is a partial section of another embodiment of the clamping sleeve to be used in this invention.

The slits 32 of the clamping sleeve 33 are not limited to the embodiment shown in FIG. 2A, but may be oblique slits 32 shown in FIG. 2B.

Figure 5A:
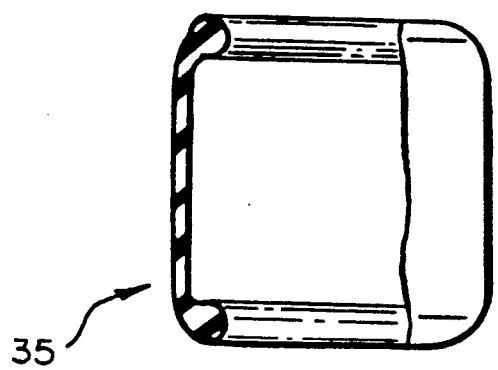
FIG. 5A is a partial section of another embodiment of the elastic member of this invention.
Figure 5B:
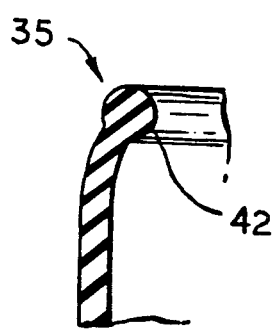
FIG. 5B is an enlarged cross section of the essential parts of FIG. 5A.

FIGS. 5A and 5B show a modification of the elastic member 35 in the clamp device 30. The elastic member 35 has inflated portions 42 in the form of an O-ring at both ends of the cylinder. This enhances the sealing property between the perimeter 31 of the sleeve 33 and the elastic member.

Although the above embodiments show the clamp devices 30 as applied in a direct drive type rotation indexing device 10 which can index precisely and minutely as the indexing table 25 is driven by a rotational shaft which is integrally fixed to an output shaft 14 on a motor rotor 13 opposing a motor stator 13, and the rotational angle is controlled by a resolver 20, application is not necessarily limited to the indexing table driving. It may be applied to the case where rotational angle is not controlled by a resolver 20.

Clamp devices 30 in the above embodiments of the type have been described where the outer perimetric face 14a of the output shaft 14 is opposed to the inner perimetric face 33b of the sleeve 33, but the outer perimetric face of the sleeve may be arranged to oppose the inner perimetric face of the output shaft conversely. In that case, the elastic member 35 covers the side of the inner perimetric face of the sleeve 33.

As stated in detail in the foregoing statement, as the clamp device according to this invention is so structured that braking force is applied in the radial direction on the rotational shaft, no thrust force is applied on the rotational shaft unlike the conventional devices, and therefore no displacement occurs in the shaft. No thrust force is applied on the bearings of the rotational shaft, either. Therefore, no means is necessary for applying a force which should counter the braking force. This can simplify the structure and decrease the weight and size.

As the cylindrical peripheral face of the rotational shaft is used as a braking surface, the braking area may be made larger to thereby reduce pressure per unit area.

As the elastic member is closely attached to the clamping sleeve having slits to apply radial pressure uniformly on the perimetric surface of the shaft, clamping can be achieved with a high precision without causing displacement of the shaft.

What is claimed is:

1. A rotary indexing device comprising:
    a housing including an inner cylinder and an outer cylinder which are concentrically arranged at a radial space therebetween;
    an output shaft having a hollow cylinder rotatably supported by the outer cylinder of said housing via bearings, a portion of said hollow cylinder being concentrically arranged within the radial space of said housing;
    an indexing drive motor having a motor stator fixed inside the housing and a motor rotor fixed on the output shaft and provided coaxially with said motor stator;
    a rotational angle detector for detecting the rotational angle of the output shaft relative to the housing;
    a rotation indexing table fixed to an end of the output shaft; and
    a clamp device having a clamping sleeve arranged in the radial space between perimetric faces of the output shaft and the housing, a middle portion of the sleeve in an axial direction being opposed to one face of the perimetric faces across a narrow interstice, both ends of the sleeve being secured in an airtight manner to the other face of the perimetric faces, and being formed with a large number of slits on said middle portion to communicate an inner and an outer region therefrom, an annular elastic member which covers said large number of slits of the sleeve to form a pressurizing chamber with said other face of the perimetric faces, and a fluid path to feed pressurizing fluid into said pressurizing chamber, said clamping sleeve being deformed radially to cause said narrow interstice to vanish and press onto said one face of the perimetric faces with the pressurizing force from said pressurizing chamber, thereby causing the clamping of the output shaft against the housing.

2. The rotary indexing device as claimed in claim 1, wherein the slits of said clamping sleeve are formed axially in parallel to each other.

3. The rotary indexing device as claimed in claim 1, wherein the slits of said clamping sleeve are formed obliquely with respect to the axial direction of the sleeve.

4. The rotary indexing device as claimed in claim 1, wherein said annular elastic member is held on steps formed on the both ends of said clamping sleeve at both peripheries of said annular elastic member.

* * * * *